United States Patent
Manocha et al.

(10) Patent No.: US 12,374,371 B1
(45) Date of Patent: Jul. 29, 2025

(54) COMPUTER-IMPLEMENTED MEDIA PLAYER TO PLAY MULTIPLE AUDIO TRACKS AT THE SAME TIME TO ENABLE ACCESSIBILITY EXPERIENCES

(71) Applicant: Amazon Technologies, Inc., Seattle, WA (US)

(72) Inventors: Ankit Prem Manocha, Lynnwood, WA (US); Abhishek Patidar, Sammamish, WA (US); Pemra Narli, Seattle, WA (US); Arjun Cholkar, Bothell, WA (US); Jayashree Rajagopalan, Bangalore (IN); Kumar Sohony, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 18/450,868

(22) Filed: Aug. 16, 2023

(51) Int. Cl.
- *G11B 27/00* (2006.01)
- *G06F 3/16* (2006.01)
- *G11B 27/10* (2006.01)

(52) U.S. Cl.
CPC .............. *G11B 27/10* (2013.01); *G06F 3/162* (2013.01)

(58) Field of Classification Search
CPC ....... G11B 27/00; G11B 27/10; G11B 27/029; G11B 27/036; G06F 3/162; G06F 3/16
USPC ................. 386/285, 282, 278, 280
See application file for complete search history.

(56) References Cited

U.S. PATENT DOCUMENTS

| | | | |
|---|---|---|---|
| 10,432,690 B1* | 10/2019 | Li | H04L 65/612 |
| 2012/0303766 A1* | 11/2012 | McGowan | H04N 21/26258 |
| | | | 709/219 |
| 2017/0006331 A1* | 1/2017 | Jairath | H04N 21/4305 |

* cited by examiner

Primary Examiner — Daquan Zhao
(74) Attorney, Agent, or Firm — NICHOLSON DE VOS WEBSTER & ELLIOTT LLP

(57) ABSTRACT

Techniques for playing a first audio track for a video on a first audio device of a first audience member and simultaneously playing a second audio track that includes different content for the video than the first audio track on a second audio device of a second audience member by a single media player are described. According to some examples, a computer-implemented method includes receiving, by a media player, a manifest indicating a video, a first audio track for the video, and a second audio track comprising an audio-narrated description of the video; receiving an indication from a user of the media player that indicates a first audio device of a first audience member is to output the first audio track, and that indicates a second audio device of a second audience member is to output the second audio track; sending the video to a display coupled to the media player for displaying of the video to the first audience member and the second audience member; sending the first audio track, concurrently with the sending of the video to the display, to the first audio device of the first audience member by a first audio player of the media player; and sending the second audio track, concurrently with the sending of the video to the display and the sending of the first audio track to the first audio device, to the second audio device of the second audience member by a second audio player of the media player.

20 Claims, 10 Drawing Sheets

COMPUTER-IMPLEMENTED MEDIA PLAYER TO PLAY MULTIPLE AUDIO TRACKS AT THE SAME TIME TO ENABLE ACCESSIBILITY EXPERIENCES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

DETAILED DESCRIPTION

Figure 1:
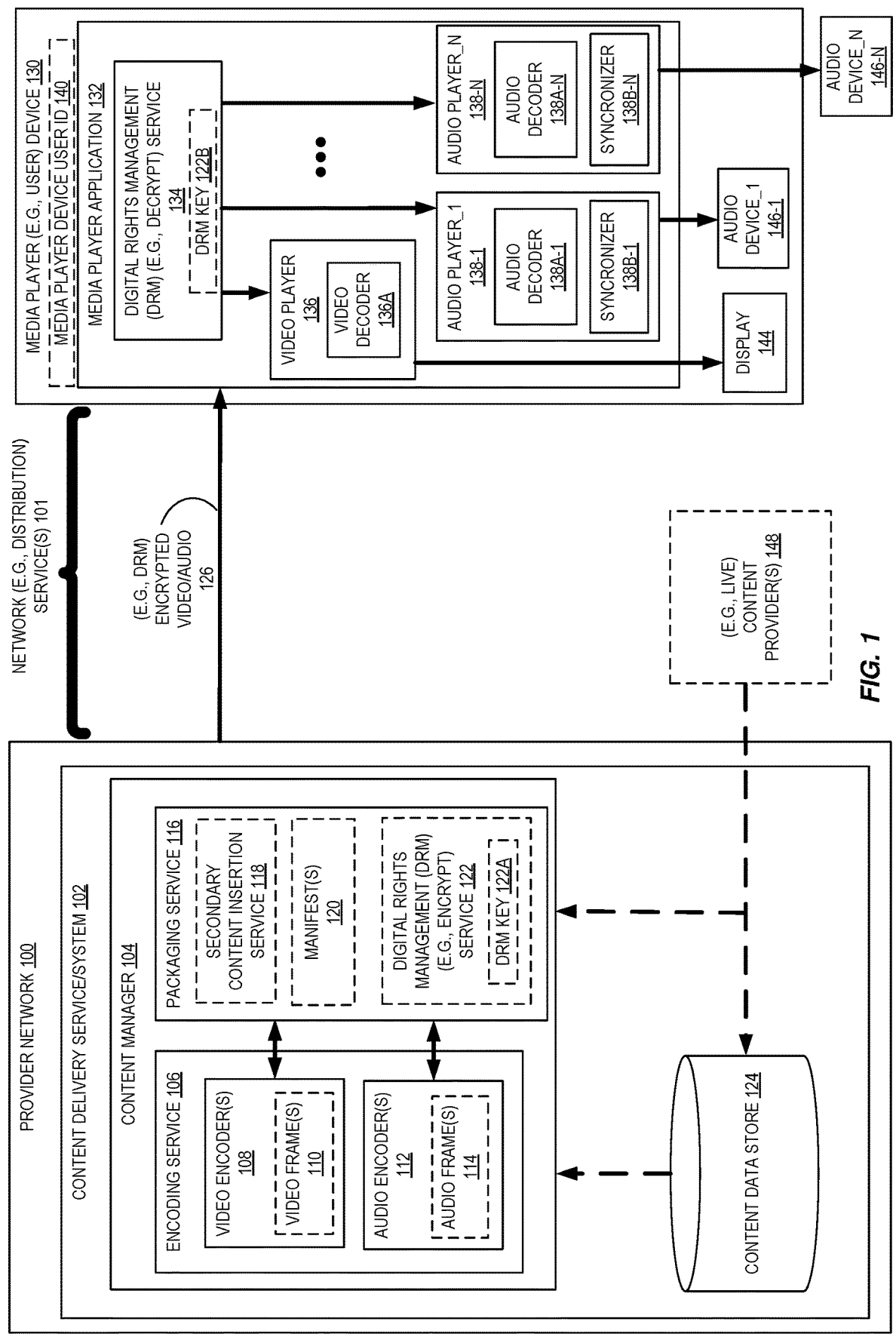
FIG. 1 is a diagram illustrating an environment including a content delivery service/system coupled to a media player (e.g., user) device that comprises a media player application that simultaneously outputs video to a display, a first audio track to a first audio device, and a second different audio track to a second different audio device according to some examples.

The present disclosure relates to methods, apparatus, systems, and non-transitory computer-readable storage media for playing a first audio track for a video on a first audio device of a first audience member and simultaneously playing a second audio track that includes different content for the video than the first audio track on a second audio device of a second audience member by a media player. Certain examples herein are directed to a (e.g., single) media player (e.g., (e.g., single) media player application and/or (e.g., single) media player device) that plays multiple audio tracks at the same time, e.g., to enable accessibility experiences and/or multi-lingual experiences on the same media player (e.g., media player application and/or media player device).

In certain examples, a media player is able to output audio for a video where the audio includes an audio-narrated description of the video, e.g., where the output audio includes the audio-narrated description added to the video's native audio (e.g., the speech and the sounds in the video). In certain examples, the audio-narrated description assumes that an audience member (e.g., viewer of the video) viewer cannot see, and therefore describes certain (e.g., the key) visual elements that may be necessary to understand the content, e.g., as an accommodation for audience members with a visual disability (e.g., blind and/or low vision audience members). In certain examples, an audio track with an audio-narrated description is referred to as "descriptive audio". For example, a scene of an automobile chase may include an audio-narrated description indicating "sports car driving on a bridge while being chased by another car".

In certain examples, a video includes a first audio track of the native audio and a second different audio track of the descriptive audio (e.g., where the second audio track is not just a different format of the first audio track). However, certain media players (e.g., the media player standard that the media player operates according to) only allows a single audio track to be output (e.g., by internal speakers of a media player device and/or external speaker(s) coupled to the media player device) for a video that is being output. Thus, in certain examples where the media player is outputting the second different audio track of the descriptive audio along with the video, all the audience members (e.g., all people in a room where the media player device is displaying the video and outputting the audio) are forced to listen to the descriptive audio which may be a hinderance to their experience.

Certain examples herein are directed to a media player (e.g., media player application and/or media player device) that plays a video and multiple audio tracks at the same time on different audio devices coupled to the media player to selectively enable (i) one or more first audio devices to play a first audio track of the native audio of the video and simultaneously (ii) one or more second audio devices to play a second different audio track of the descriptive audio of the video. To achieve this, certain examples herein utilize a player in player approach to enable two audio tracks playing at the same time and synchronized with the video (e.g., such that the portion of the audio being output matches the portion of the video being displayed). To achieve this, certain examples herein are directed to a media player that implements (i) a first audio player (e.g., first audio decoder and/or first audio/video synchronizer) to output a first audio track of the native audio to the one or more first audio devices and (ii) a second audio player (e.g., second audio decoder and/or second audio/video synchronizer) to output a second different audio track of the descriptive audio to the one or more second audio devices. In certain examples, the one or more first audio devices is a room speaker (e.g., a set of speakers of a multiple channel audio system that outputs the first audio track, such as, but not limited to, a multiple channel audio system according to a surround sound audio standard). In certain examples, the one or more second audio devices are headphone device(s) (e.g., one or more sets of earbuds). Thus, examples herein enable people with different audio needs to watch the same video content within the same room but with different audio experiences.

Certain examples herein include a (i) a first audio (e.g., volume) control for the first audio player (e.g., first audio decoder and/or first audio/video synchronizer) to control the output of the first audio track of the native audio to the one or more first audio devices and (ii) a first audio (e.g., volume) control for the second audio player (e.g., second audio decoder and/or second audio/video synchronizer) to control the output of the second different audio track of the descriptive audio to the one or more second audio devices.

Certain examples herein are not merely switching a single audio player of a media player from a first audio track to a second audio track, e.g., an auxiliary audio track such as, but not limited to, a second audio program (SAP). Certain examples herein are directed to a media player that includes a video player and a plurality of audio players, e.g., where the media player detects multiple audio devices and allows for (e.g., each) the selection of an audio track from multiple audio tracks for the video that is to be displayed. In certain examples, a manifest from a video is modified to include multiple audio tracks for that video, e.g., a first storage location (e.g., Uniform Resource Locator (URL) thereof) for the first audio track of the native audio and a second storage location (e.g., Uniform Resource Locator (URL) thereof) for the second different audio track of the descriptive audio, e.g., where the media player is allowed to access both the first storage location and the second storage location simultaneously.

In certain examples, there are technical blockers to (e.g., legally) accessing a media file (e.g., an encrypted and encoded media file) on the device side. One example of a technical blocker is Digital Rights Management (DRM) protection, e.g., that control the use, modification, and/or distribution of copyrighted works (e.g., software, multimedia content, images, etc.) and the system(s) that enforce these policies within devices. In certain examples, DRM protection includes use of a (e.g., DRM) product key that represents an allowed access (e.g., a license) for an encrypted file. In certain examples, media files (e.g., media streams) sent to end user's (e.g., client's and/or end customer's) devices are encrypted with Digital Rights Management (DRM) protection to defend against capture of the source content in its original quality, e.g., for re-watching or distribution. In certain examples, to display a video and/or audio stream on a device (e.g., smart Television, set-top box, computer, gaming platform, or mobile device) includes taking the input stream, decrypting it, decoding the decrypted data, and providing the decrypted and decoded media file to the output screen and/or audio output. In certain examples, for devices that do not include an internal display (e.g., screen) in their product configuration, separate encryption (e.g., according to a High-bandwidth Digital Content Protection (HDCP) standard) is also included in the transport from the device to the external display (e.g., screen). In certain examples, end user devices (e.g., via the end user device's manufacturer) provide (i) methods for streaming providers (or third-parties) to implement media player applications (e.g., code) on the end user device (e.g., "platform") for navigating to content and then initiating playback, etc. or (ii) assist in porting a media player application onto the end user device (e.g., "platform"). Thus, certain examples herein are directed to a (e.g., permitted) modification the technical blockers to (e.g., legally) accessing a media file (e.g., an encrypted and encoded media file) on the device side, e.g., the DRM protection, to allow (i) a first audio player (e.g., first audio decoder and/or first audio/video synchronizer) to output a first audio track of the native audio to the one or more first audio devices and (ii) a second audio player (e.g., second audio decoder and/or second audio/video synchronizer) to output a second different audio track of the descriptive audio to the one or more second audio devices.

In certain examples, a user can also have the ability to choose primary (e.g., a first language) and secondary (e.g., different language than the first) audio tracks. Thus, examples herein enable people with different audio preferences to watch the same content within the same room. For example, where one audience member wants to watch a video (e.g., movie) in a first language (e.g., Hindi) and another audience member wants to watch the same video (e.g., movie) at the same time in a second language (e.g., English). Certain examples herein enable that capability.

Turning now to the figures, FIG. 1 is a diagram illustrating an environment including a content delivery service/system 102 coupled to a media player (e.g., user) device 130 that comprises a media player application 132 that simultaneously outputs video to a display 144, a first audio track to a first audio device 146-1, and a second different audio track to a second different audio device 146-N (e.g., where N is any positive integer greater than one) according to some examples.

In certain examples, the provider network 100 (e.g., cloud provider) is coupled to the media player device 130 via network (e.g., distribution) service(s) 101. In certain examples, media player (e.g., client) device 130 is to play one or more feeds (e.g., live streams), for example, (e.g., on-demand and/or linear television (TV) (e.g., that can be viewed according to a set schedule, e.g., not on demand)) audio/video, e.g., sent via network (e.g., distribution) services 101. In certain examples, the media sent is (e.g., DRM) encrypted video/audio 126.

In certain examples, a content provider 148 is to send content to a content data store 124 (e.g., which may be implemented in one or more data centers) and/or content manager 104 (e.g., a single content manager or multiple content managers). In certain examples, a content provider 148 is on site to capture video (e.g., and audio) of a live event. In certain examples, content provider 148 is to encode the resulting output and send that encoded content to one or more downstream entities (e.g., content delivery service/system 102), e.g., via one or more networks.

In certain examples, a single media file includes a video and multiple audio tracks, e.g., (i) a first audio track of the native audio for the video and (ii) a second different audio track of the descriptive audio for the video.

As one example, a media file (e.g., including a video file and multiple audio files) (e.g., a media container) that is to be encoded is accessed from the content data store 124 by content manager 104. In certain examples, the media file may be uploaded to content data store 124 by content provider(s) 148 or provided directly (e.g., as live content) to one or more content managers 104 by content provider(s) 148 (e.g., from a live content encoder).

In certain examples, the content manager 104 controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply (e.g., descriptive audio), etc. In certain examples, to set up a job, a user specifies the input files (e.g., from content data store 124) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio files) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, a single audio encoder 112 is to generate (i) a first audio track of the native audio for the video and (ii) a second different audio track of the descriptive audio for the video. In certain examples, a respective first audio encoder of multiple audio encoders 112 is to generate (i) a first audio track of the native audio for the video and a respective second audio encoder of multiple audio encoders 112 is to generate (ii) a second different audio track of the descriptive audio for the video.

In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to process multiple inputs in parallel. In certain examples, secondary content insertion service 118 adds secondary content (e.g., advertisement(s)) into a main content. In certain examples, encoding service 106 is to encode both the main content and secondary content, e.g., and the secondary content insertion service 118 is to insert the secondary content into the main content.

In certain embodiments, packaging service 116 includes one or more manifests 120, e.g., identifying the media file(s) (e.g., fragments, streams, etc.). In certain embodiments, a manifest for a particular media file (e.g., a particular title) identifies a proper subset of video and audio representations of the media file for a particular viewer device 130 (e.g., based on the client's media player (e.g., determined from its media player device user ID value 140), display 144 resolution, audio output 146-1 to 146-N capabilities, and/or available bandwidth). In certain examples, a first audio representation is included for room speakers and a second audio representation is includes for headsets, e.g., with both of those representations provided for each of (i) a first audio track of the native audio for the video and (ii) a second different audio track of the descriptive audio for the video.

In certain embodiments, the content is stored in the content delivery service/system 102 in two parts: (i) the manifest 120 of all available media representations (e.g., their URL addresses and, optionally, other characteristics) and (ii) the media files (e.g., representations) (e.g., stream of fragments) in a single (e.g., container) or multiple files (e.g., in content data store 124). In certain embodiments, a viewer device 130 is to read a manifest 120 (e.g., sent in response to manifest request) before the client device may make a request for the media from that manifest, and thus access media files (e.g., video fragments and/or corresponding audio fragments) from content data store 124.

In certain examples, the content delivery service/system 102 includes a Digital Rights Management (DRM) (e.g., encryption) service 122, e.g., to encrypt a media file according to a DRM key 122A.

In certain examples, media player device 130 executes a media player application 132. In certain examples, media player application 132 includes a corresponding support platform, e.g., implemented on one or more provider network(s) 100. In certain examples, media player application 132 is provided data (e.g., content) by the platform (e.g., content delivery service/system 102). In certain examples, media player application 132 includes a corresponding graphical user interface (GUI) that is displayed on display 144, e.g., to allow a user to select content for viewing and/or listening.

In certain examples, media player device 130 (e.g., media player application 132) includes a digital rights management (DRM) (e.g., decryption) service 134. In certain examples, the encrypted media (e.g., video/audio) 126 (e.g., encrypted by the DRM (e.g., encryption) service 122 of the content delivery service/system 102 according to a DRM key 122A) is decrypted by the digital rights management (DRM) (e.g., decryption) service 134 of the media player device 130, for example, by DRM key 122B. In certain examples, the DRM key 122B is provided to an authorized media player device 130 to allow the media player device 130 to decrypt (e.g., and allow the user to view/listen to) the media file. In certain examples, the DRM key 122B is to match the DRM key 122A to allow the media player device 130 to decrypt (e.g., and allow the user to view/listen to) the media file. In certain examples, a DRM key (e.g., DRM key 122B) is a product key, e.g., that represents a license to a particular media file. In certain examples, a DRM service (e.g., DRM service 122 and DRM service 134) is used to (e.g., continually for a single file access or a single time for each single file access) check that the media player device 130 is allowed to access (e.g., decrypt) the encrypted media (e.g., video/audio) 126.

In certain examples, media player device 130 includes a video player 136 to output the video (e.g., including video decoder 136A to decode (e.g., decrypted) video) for viewing on display 144.

In certain examples, media player device 130 includes a first audio player 138-1 to output (i) the first audio track of the native audio for the video (e.g., the audio player 138-1 including an audio decoder 138A-1 to decode (e.g., decrypted) audio and/or an audio synchronizer 138B-1 to synchronize the displayed video with the output audio) on the first audio device (e.g., first set of one or more speakers) 146-1.

In certain examples, media player device 130 includes a second (or third, etc.) audio player 138-N to output (ii) a second different audio track of the descriptive audio for the video (e.g., the audio player 138-N including an audio decoder 138A-N to decode (e.g., decrypted) audio and/or an audio synchronizer 138B-N to synchronize the displayed video with the output audio) on the second audio device (e.g., second set of one or more speakers) 146-N.

Certain examples of media (e.g., DRM) protection may not allow (e.g., the media player device 130) the simultaneous use of the decrypted audio file by multiple audio players of a single video being displayed. To overcome this, certain examples herein allow (e.g., the media player device 130) the first audio player 138-1 to access and play (i) a first audio track of the native audio for the video simultaneously with allowing the second audio player 138-N to access and play (ii) a second different audio track of the descriptive audio for the video, e.g., to maintain DRM protection.

In certain examples, the display 144 is part of (e.g., internal to) the media player device 130. In certain examples, the first audio output 146-1 (e.g., speaker(s)) is part of the media player device 130, e.g., part of a smart television device or smart phone device. In certain examples, the second audio output 146-N (e.g., speaker(s)) is external to the media player device 130, for example, where the second audio output 146-N is a headset (e.g., a wireless or wired headset).

In certain examples, media player device 130 includes a media player device user identification (ID) 140, e.g., to uniquely identify the user of that media player device 130. In certain examples, DRM service 134 uses the media player device user ID 140 for DRM protection.

Figure 2:
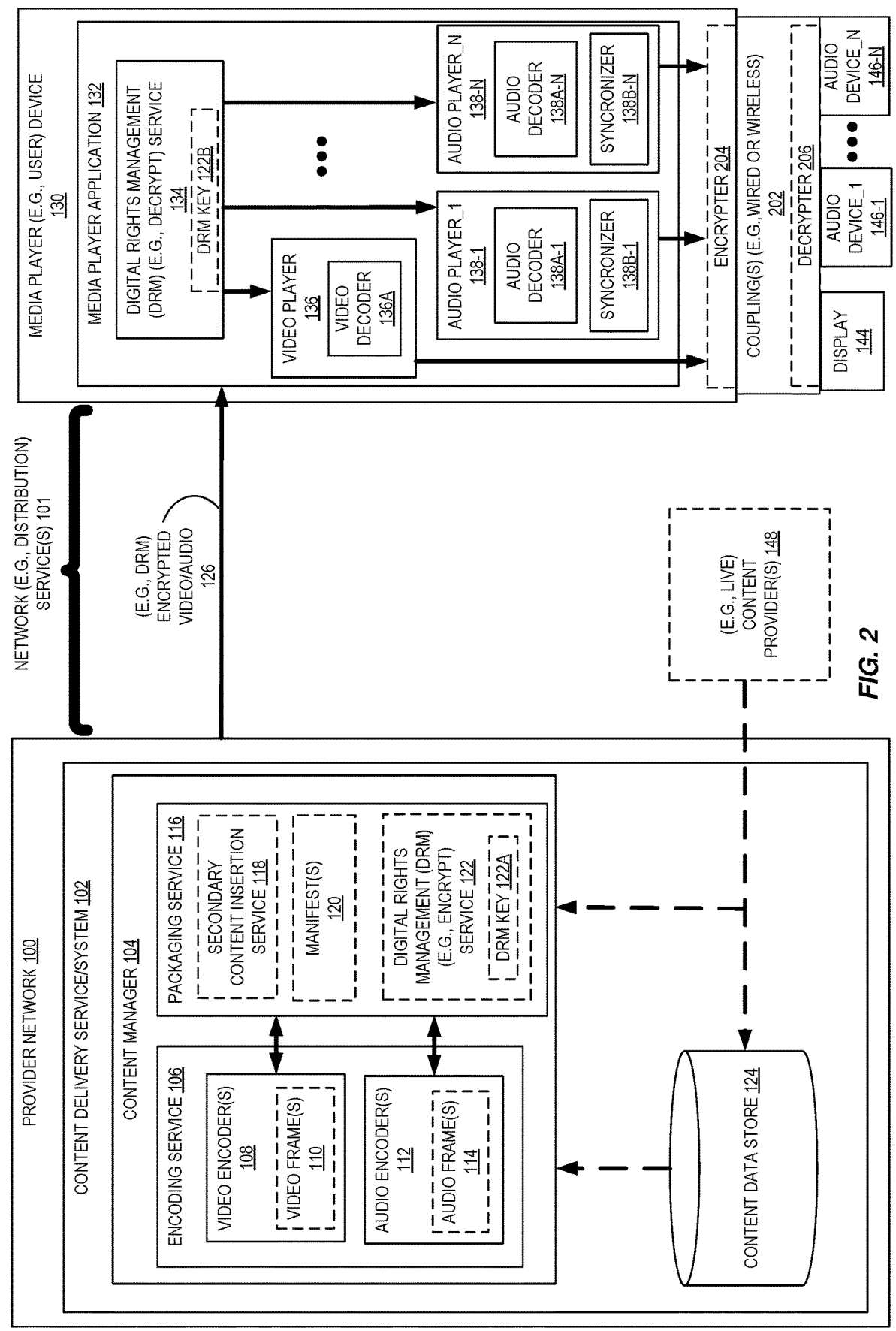
FIG. 2 is a diagram illustrating an environment including a content delivery service/system coupled to a media player (e.g., user) device that comprises a media player application that simultaneously outputs video to an external display, a first audio track to a first external audio device, and a second different audio track to a second different external audio device according to some examples.

FIG. 2 is a diagram illustrating an environment including a content delivery service/system 102 coupled to a media player (e.g., user) device 130 that comprises a media player application 132 that simultaneously outputs video to an external display 144, a first audio track to a first external audio device 146-1, and a second different audio track to a second different external audio device 146-N according to some examples. In certain examples, one or more components in FIG. 2 are the components from FIG. 1.

In certain examples, in comparison to FIG. 1, FIG. 2 illustrates an external display 144 and/or external audio output 146-1 to 146-N. In certain examples, decoded content (e.g., video and/or audio) from media player device 130 (e.g., from video player 136, audio player 138-1, and audio player 138-N) is encrypted by encrypter 204 and that encrypted content is sent to the external display 144, external audio output 146-1, and/or external audio output 146-N for decryption and output, e.g., to protect the content from unauthorized access during transmission to the display 144 (e.g., and/or graphics card) and/or external audio outputs 146-1 to 146-N.

In certain examples, a (e.g., wired and/or wireless) coupling 202 (e.g., according to a standard, such as, but not limited to, a High-Definition Multimedia Interface (HDMI) standard) is included to connect display 144, external audio output 146-1 (e.g., first set of speaker(s)), and/or external audio output 146-N (e.g., second set of speaker(s)) to media player device 130. In certain examples, the display 144, external audio output 146-1 (e.g., first set of speaker(s)), and/or external audio output 146-N (e.g., second set of speaker(s)) are separate from the media player device 130, e.g., a "stick" media player device. In certain examples, coupling 202 includes decrypter 206, e.g., to decrypt the content for output on external display 144, external audio output 146-1, and/or external audio output 146-N. In certain examples, the decrypter 206 is part of the external display 144, external audio output 146-1, and/or external audio output 146-N.

Figure 3:
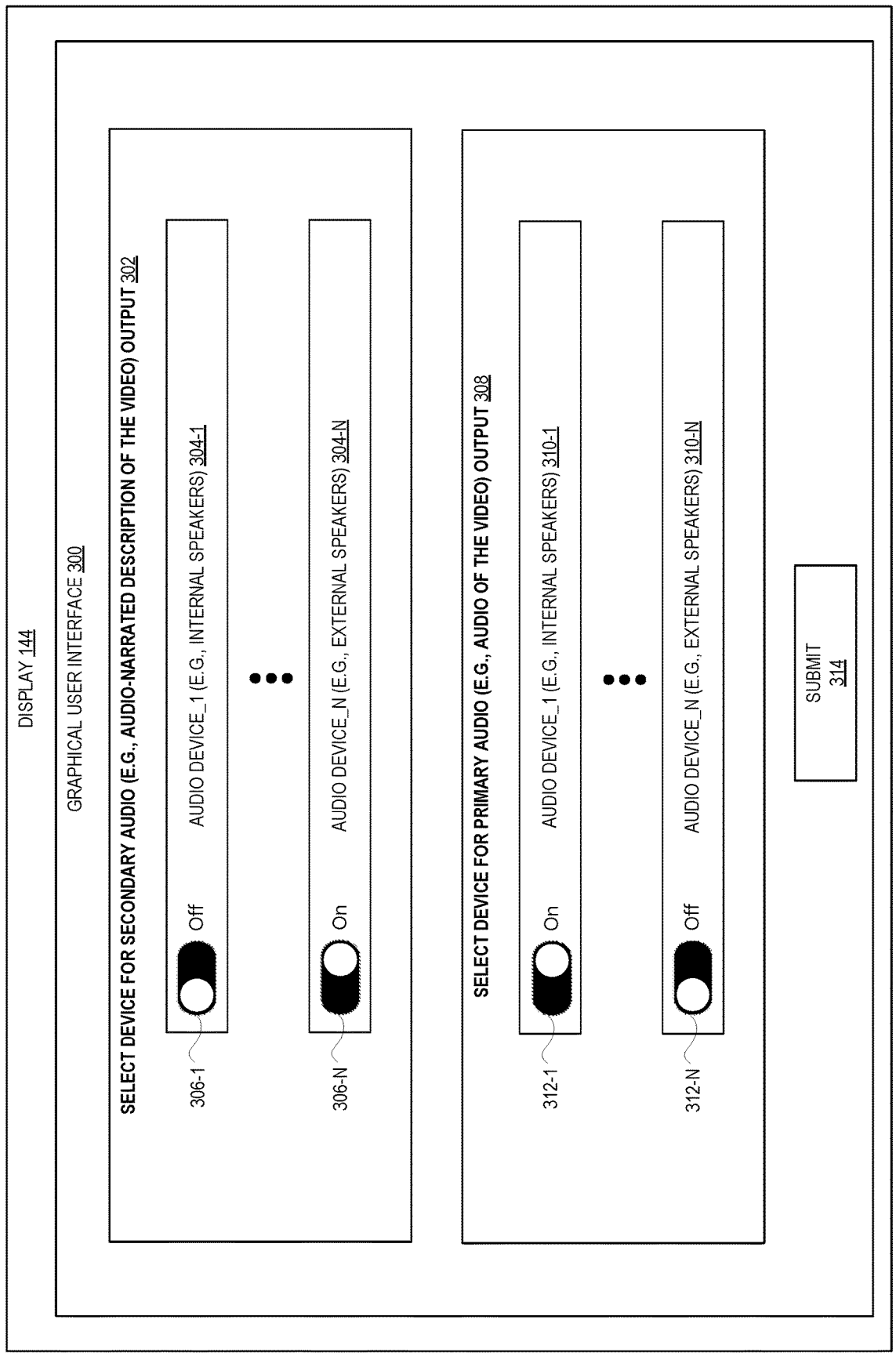
FIG. 3 is a diagram illustrating a display displaying a graphical user interface (GUI) including multiple interface elements for respectively selecting which audio device(s) are to output a first audio track of the video and which audio device(s) are to output a second audio track of the video according to some examples.

FIG. 3 is a diagram illustrating a display 144 displaying a graphical user interface (GUI) 300 including multiple interface elements for respectively selecting, in block 308, which audio device(s) are to output a first audio track of the video and, in block 302, which audio device(s) are to output a second audio track of the video according to some examples. In certain examples, GUI 300 includes a first set of interface elements 312-1 to 312-N (e.g., where N is the number of separate audio devices) to allow for the selection of a device(s) for the primary audio (e.g., native audio for the video) to be output. In certain examples, GUI 300 includes a second set of interface elements 306-1 to 306-N (e.g., where N is the number of separate audio devices) to allow for the selection of a device(s) for the secondary audio (e.g., audio-narrated description of the video) to be output. In certain examples, GUI 300 includes interface elements for the secondary audio, e.g., but not interface element(s) for the primary audio.

An interface element, may include, but is not limited to, a (e.g., off or on) slider (as shown), thumbs up (or down), checkbox, button, dropdown menu, etc.

Depicted graphical user interface 300 includes a field 304-1 that is customizable with text to indicate that these are settings for secondary audio for audio device 146-1 (e.g. internal speakers of media player device 130) and an interface element 306-1 that, when selected, will cause a media player device 130 (for example, media player application 132, e.g., audio player 138-1 thereof) to output the secondary audio (e.g., audio-narrated description of the video) for the video that is to be displayed, e.g., and not output the primary audio from that audio device.

Depicted graphical user interface 300 includes a field 304-N that is customizable with text to indicate that these are settings for secondary audio for audio device 146-N (e.g. external speakers of media player device 130) and an interface element 306-N that, when selected, will cause a media player device 130 (for example, media player application 132, e.g., audio player 138-N thereof) to output the secondary audio (e.g., audio-narrated description of the video) for the video that is to be displayed, e.g., and not output the primary audio from that audio device.

Depicted graphical user interface 300 includes a field 310-1 that is customizable with text to indicate that these are settings for primary audio for audio device 146-1 (e.g. internal speakers of media player device 130) and an interface element 312-1 that, when selected, will cause a media player device 130 (for example, media player application 132, e.g., audio player 138-1 thereof) to output the primary audio (e.g., native audio for the video) for the video that is to be displayed, e.g., and not output the secondary audio from that audio device.

Depicted graphical user interface 300 includes a field 310-N that is customizable with text to indicate that these are settings for primary audio for audio device 146-N (e.g. external speakers of media player device 130) and an interface element 312-N that, when selected, will cause a media player device 130 (for example, media player application 132, e.g., audio player 138-N thereof) to output the primary audio (e.g., native audio for the video) for the video that is to be displayed, e.g., and not output the secondary audio from that audio device.

A user (e.g., cloud customer) may click the submit interface element 314 to (e.g., cause a command to be sent that causes) these settings to be sent to the media player device 130 (e.g., media player application 132). An interface element, may include, but is not limited to, a thumbs up (or down), checkbox, button, dropdown menu, etc.

Although the interface elements are shown as grouped for secondary audio and primary audio, it should be understood that other selection organizations may be utilized. For example, a (e.g., drop down) menu may be utilized for each audio device that allow for selection of one of the secondary audio and primary audio that is to be output from that audio device.

Figure 4:
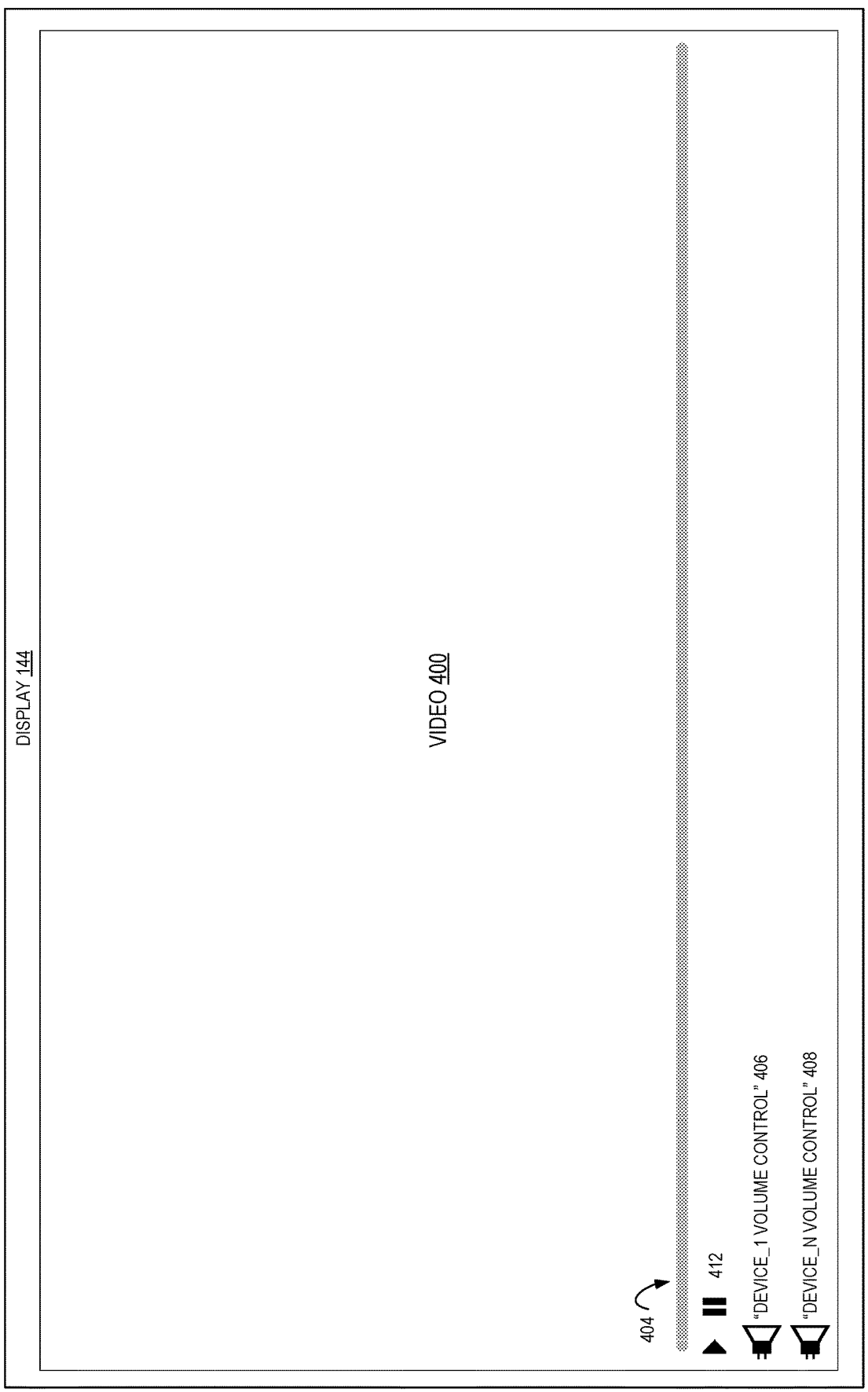
FIG. 4 is a diagram illustrating a display displaying a video and a first volume control for a first audio device and a second different volume control for a second different audio device according to some examples.

FIG. 4 is a diagram illustrating a display 144 displaying a video 400 and a first volume control 406 for a first audio device 146-1 and a second different volume control 408 for a second different audio device 146-N according to some examples.

In certain embodiments, controls (e.g., shown as a first speaker for first volume (e.g., volume level which may include mute) control 406 for a first audio device 146-1 and/or as a second speaker for a second different volume (e.g., volume level which may include mute) control 408 for a second different audio device 146-N) is overlaid (e.g., with some level of transparency of the overlay) onto video 400 content. In certain examples, other audio control interfaces may be utilized, for example, to control other audio settings (e.g., bass, treble, etc.).

In certain examples, other media player control interface element(s) may be included (shown as a timeline indicator 404, and play and pause 412, but may include other controls such as fast forward or reverse, skip chapters, etc.).

Figure 5:
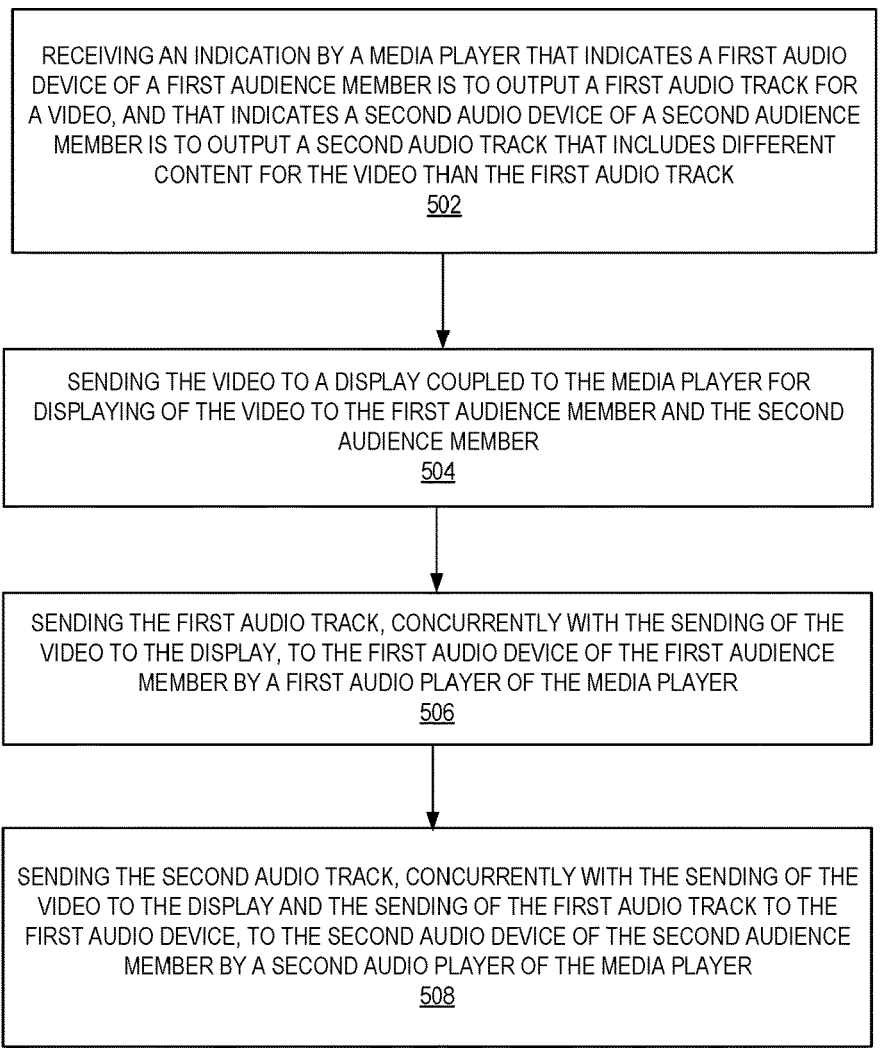
FIG. 5 is a flow diagram illustrating operations of a method of sending a first audio track for a video to a first audio device of a first audience member and a second audio track that includes different content for the video than the first audio track to a second audio device of a second audience member by a media player according to some examples.

FIG. 5 is a flow diagram illustrating operations 500 of a method of sending a first audio track for a video to a first audio device of a first audience member and a second audio track that includes different content for the video than the first audio track to a second audio device of a second audience member by a media player according to some examples.

Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 500 are performed by a media player device 130 of the other figures.

The operations 500 include, at block 502, receiving an indication by a media player that indicates a first audio device of a first audience member is to output a first audio track for a video, and that indicates a second audio device of a second audience member is to output a second audio track that includes different content for the video than the first audio track. The operations 500 further include, at block 504, sending the video to a display coupled to the media player for displaying of the video to the first audience member and the second audience member. The operations 500 further include, at block 506, sending the first audio track, concurrently with the sending of the video to the display, to the first audio device of the first audience member by a first audio player of the media player. The operations 500 further include, at block 508, sending the second audio track, concurrently with the sending of the video to the display and the sending of the first audio track to the first audio device, to the second audio device of the second audience member by a second audio player of the media player.

At least some examples of the disclosed technologies can be described in view of the following examples:

Example 1. A computer-implemented method comprising:
receiving, by a media player, a manifest indicating a video, a first audio track for the video, and a second audio track comprising an audio-narrated description of the video;
receiving an indication from a user of the media player that indicates a first audio device of a first audience member is to output the first audio track, and that indicates a second audio device of a second audience member is to output the second audio track;
sending the video to a display coupled to the media player for displaying of the video to the first audience member and the second audience member;
sending the first audio track, concurrently with the sending of the video to the display, to the first audio device of the first audience member by a first audio player of the media player; and
sending the second audio track, concurrently with the sending of the video to the display and the sending of the first audio track to the first audio device, to the second audio device of the second audience member by a second audio player of the media player.

Example 2. The computer-implemented method of example 1, wherein the first audio track includes speech and sounds in the video, and the second audio track includes the speech and the sounds in the video with the audio-narrated description added.

Example 3. The computer-implemented method of example 1, further comprising:
synchronizing, by a first synchronizer of the first audio player, an output of the first audio track by the first audio device with the video being displayed on the display; and
synchronizing, by a second synchronizer of the second audio player, an output of the second audio track by the second audio device with the video being displayed on the display.

Example 4. A computer-implemented method comprising:
receiving an indication by a media player that indicates a first audio device of a first audience member is to output a first audio track for a video, and that indicates a second audio device of a second audience member is to output a second audio track that includes different content for the video than the first audio track;
sending the video to a display coupled to the media player for displaying of the video to the first audience member and the second audience member;
sending the first audio track, concurrently with the sending of the video to the display, to the first audio device of the first audience member by a first audio player of the media player; and sending the second audio track, concurrently with the sending of the video to the display and the sending of the first audio track to the first audio device, to the second audio device of the second audience member by a second audio player of the media player.

Example 5. The computer-implemented method of example 4, wherein the first audio track includes speech and sounds in the video, and the second audio track includes the speech and the sounds in the video with an audio-narrated description of the video added.

Example 6. The computer-implemented method of example 4, further comprising:
synchronizing, by a first synchronizer of the first audio player, an output of the first audio track by the first audio device with the video being displayed on the display; and
synchronizing, by a second synchronizer of the second audio player, an output of the second audio track by the second audio device with the video being displayed on the display.

Example 7. The computer-implemented method of example 4, wherein the media player is implemented by a media player device, and the first audio device comprises (e.g., only) one or more internal speakers of the media player device.

Example 8. The computer-implemented method of example 7, wherein the second audio device is a headphone device with a speaker that is external from the media player device.

Example 9. The computer-implemented method of example 4, further comprising:
displaying a graphical user interface to a user of the media player that includes a first interface element to select the second audio device to output the second audio track; and
causing the sending of the second audio track to the second audio device of the second audience member by the second audio player of the media player in response to the user selecting the second audio device via the first interface element.

Example 10. The computer-implemented method of example 9, further comprising:
displaying the graphical user interface to the user of the media player that includes a second interface element to select the first audio device to output the first audio track; and
causing the sending of the first audio track to the first audio device of the first audience member by the first audio player of the media player in response to the user selecting the first audio device via the second interface element.

Example 11. The computer-implemented method of example 4, wherein the first audio device and the second audio device are not part of a (e.g., single) set of speakers of a (e.g., single) multiple channel audio system.

Example 12. The computer-implemented method of example 4, further comprising displaying an audio control interface element for the second audio device on the display.

Example 13. The computer-implemented method of example 12, wherein the audio control interface element is a volume control for the second audio device on the display.

Example 14. The computer-implemented method of example 13, wherein the audio control interface element is not a volume control for the first audio device.

Example 15. A non-transitory computer-readable medium storing code that, when executed by a device, causes the device to perform a method comprising:
receiving an indication by a media player that indicates a first audio device of a first audience member is to output a first audio track for a video, and that indicates a second audio device of a second audience member is to output a second audio track that includes different content for the video than the first audio track;
sending the video to a display coupled to the media player for displaying of the video to the first audience member and the second audience member;
sending the first audio track, concurrently with the sending of the video to the display, to the first audio device of the first audience member by a first audio player of the media player; and
sending the second audio track, concurrently with the sending of the video to the display and the sending of the first audio track to the first audio device, to the second audio device of the second audience member by a second audio player of the media player.

Example 16. The non-transitory computer-readable medium of example 15, wherein the first audio track includes speech and sounds in the video, and the second audio track includes the speech and the sounds in the video with an audio-narrated description of the video added.

Example 17. The non-transitory computer-readable medium of example 16, wherein the method further comprises:
synchronizing, by a first synchronizer of the first audio player, an output of the first audio track by the first audio device with the video being displayed on the display; and
synchronizing, by a second synchronizer of the second audio player, an output of the second audio track by the second audio device with the video being displayed on the display.

Example 18. The non-transitory computer-readable medium of example 15, further comprising:
displaying a graphical user interface to a user of the media player that includes a first interface element to select the second audio device to output the second audio track; and
causing the sending of the second audio track to the second audio device of the second audience member by the second audio player of the media player in response to the user selecting the second audio device via the first interface element.

Example 19. The non-transitory computer-readable medium of example 15, wherein the method further comprises displaying an audio control interface element for the second audio device on the display.

Example 20. The non-transitory computer-readable medium of example 19, wherein the audio control interface element is a volume control for the second audio device on the display, and the audio control interface element is not a volume control for the first audio device.

Exemplary environments, systems, etc. that the above may be used in are detailed below.

Figure 6:
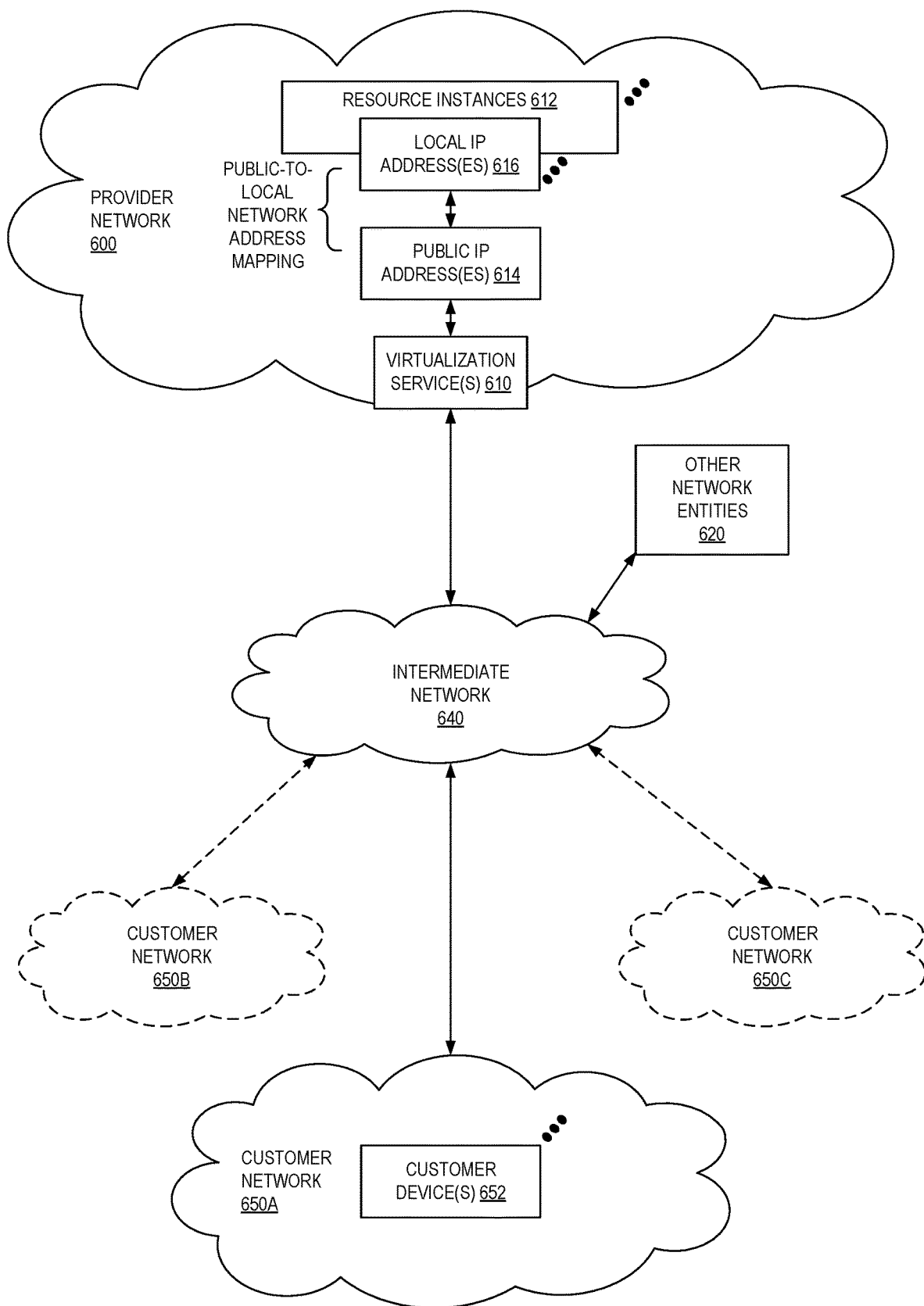
FIG. 6 illustrates an example provider network environment according to some examples.

FIG. 6 illustrates an example provider network (or "service provider system") environment according to some examples. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some examples, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
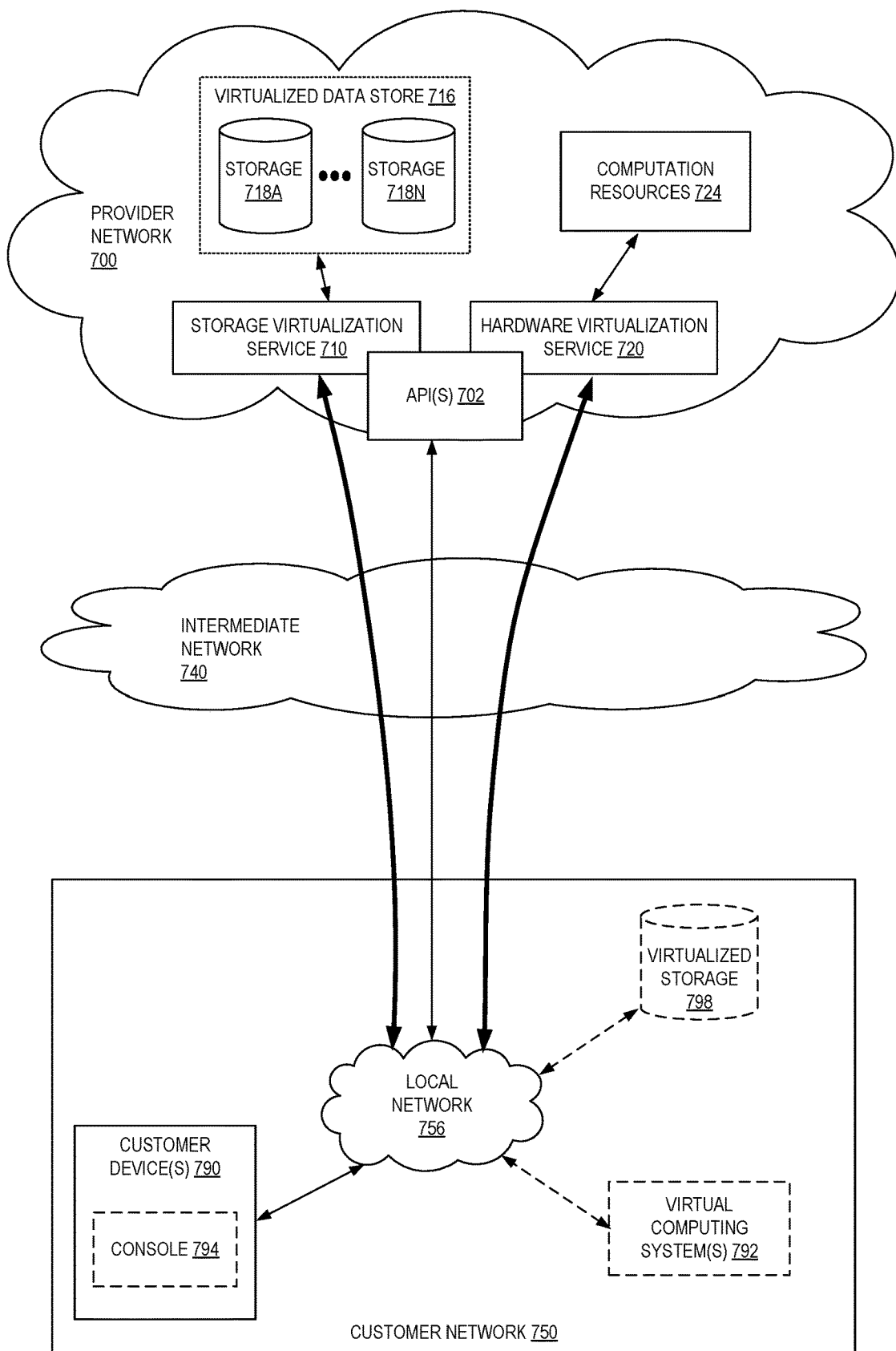
FIG. 7 is a block diagram of an example provider network that provides a storage service and a hardware virtualization service to customers according to some examples.

FIG. 7 is a block diagram of an example provider network that provides a storage service and a hardware virtualization service to customers, according to some examples. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some examples, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some examples, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some examples, a virtualized data store gateway (not shown) may be provided at the customer network 750 that may locally cache at least some data, for example frequently accessed or critical data, and that may communicate with storage service 710 via one or more communications channels to upload new or modified data from a local cache so that the primary store of data (virtualized data store 716) is maintained. In some examples, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
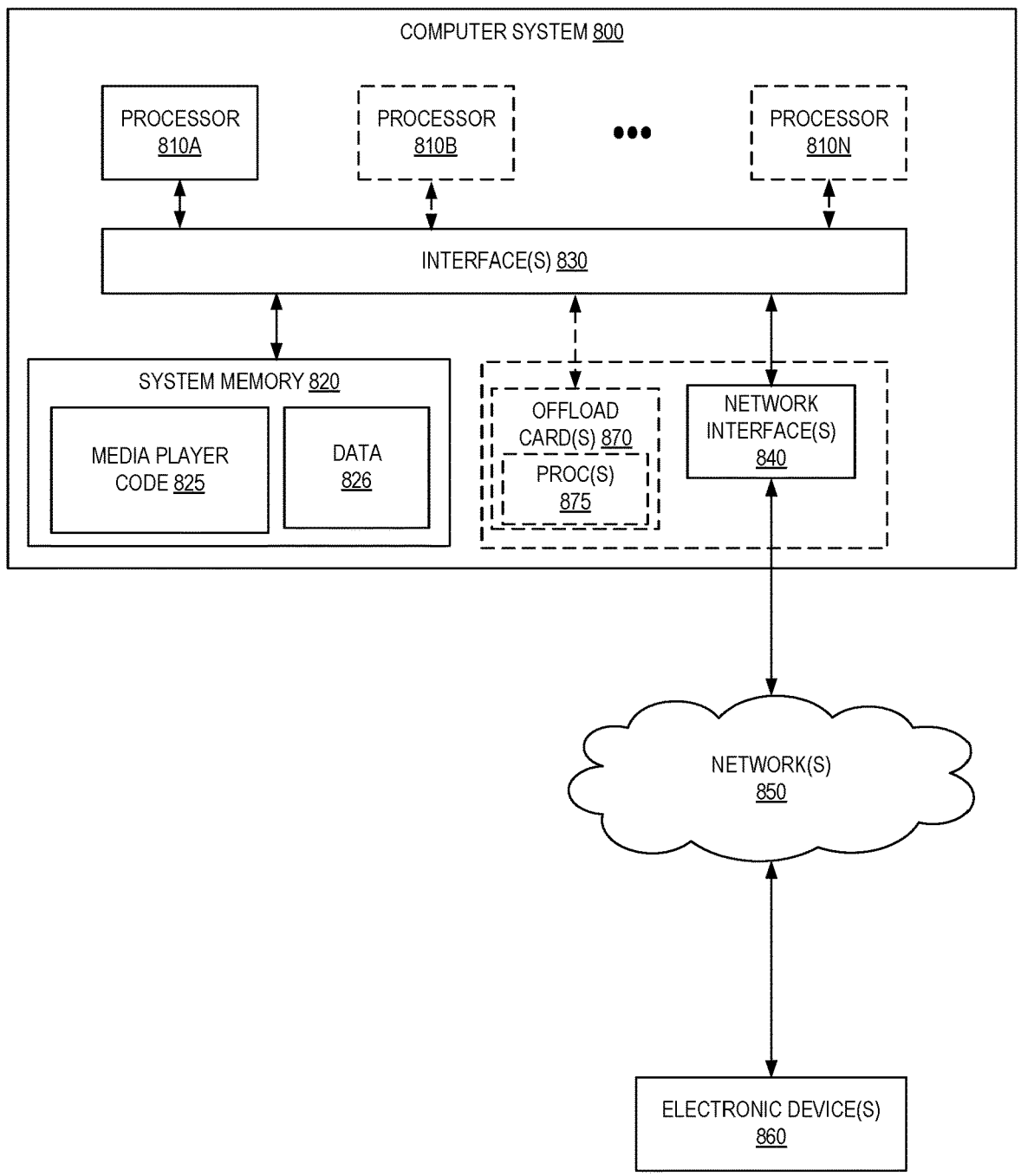
FIG. 8 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 800 illustrated in FIG. 8. In the illustrated example, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various examples a computer system 800 may include one computing device or any number of computing devices configured to work together as a single computer system 800.

In various examples, computer system 800 may be a uniprocessor system including one processor 810, or a multiprocessor system including several processors 810 (e.g., two, four, eight, or another suitable number). Processors 810 may be any suitable processors capable of executing instructions. For example, in various examples, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various examples, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 820 as media player code 825 (e.g., executable to implement, in whole or in part, the (e.g., media player application 132) operations discussed herein) and data 826.

In one example, I/O interface 830 may be configured to coordinate I/O traffic between processor 810, system memory 820, and any peripheral devices in the device, including network interface 840 or other peripheral interfaces. In some examples, I/O interface 830 may perform any necessary protocol, timing, or other data transformations to convert data signals from one component (e.g., system memory 820) into a format suitable for use by another component (e.g., processor 810). In some examples, I/O interface 830 may include support for devices attached through various types of peripheral buses, such as a variant of the Peripheral Component Interconnect (PCI) bus standard or the Universal Serial Bus (USB) standard, for example. In some examples, the function of I/O interface 830 may be split into two or more separate components, such as a north bridge and a south bridge, for example. Also, in some examples some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various examples, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some examples the offload card(s) 870 can perform compute instance management operations such as pausing and/or un-pausing compute instances, launching and/or terminating compute instances, performing memory transfer/copying operations, etc. These management operations may, in some examples, be performed by the offload card(s) 870 in coordination with a hypervisor (e.g., upon a request from a hypervisor) that is executed by the other processors 810A-810N of the computer system 800. However, in some examples the virtualization manager implemented by the offload card(s) 870 can accommodate requests from other entities (e.g., from compute instances themselves), and may not coordinate with (or service) any separate hypervisor.

In some examples, system memory 820 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
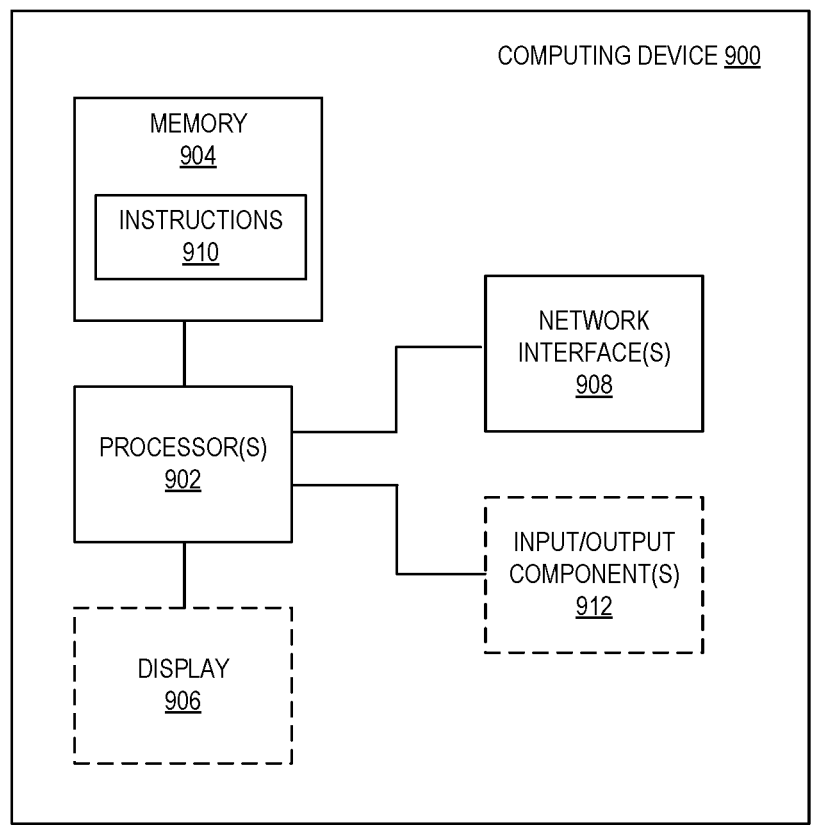
FIG. 9 illustrates a logical arrangement of a set of general components of an exemplary computing device that can be utilized in accordance with various examples.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement a content delivery service as disclosed herein), and a set of one or more wired or wireless network interfaces 908 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various examples may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some examples include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 10:
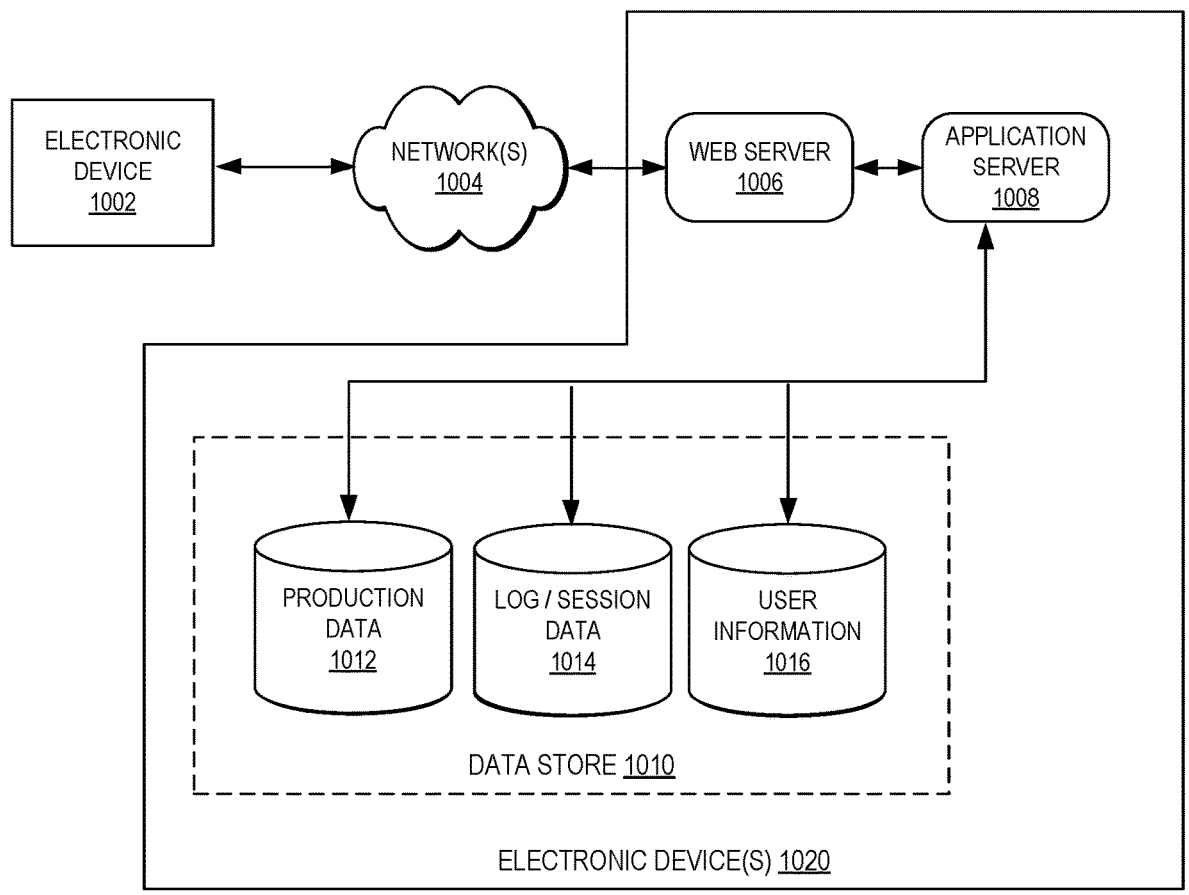
FIG. 10 illustrates an example of an environment for implementing aspects in accordance with various examples.

As discussed, different approaches can be implemented in various environments in accordance with the described examples. For example, FIG. 10 illustrates an example of an environment 1000 for implementing aspects in accordance with various examples. For example, in some examples messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various examples. The system includes an electronic client device 1002, which may also be referred to as a client device and can be any appropriate device operable to send and receive requests, messages, or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 718A-718N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a media player, a manifest indicating a video, a first audio track for the video, and a second audio track comprising an audio-narrated description of the video protected by a digital rights management key;
   receiving an indication from a user of the media player that indicates a first audio device of a first audience member is to output the first audio track, and that indicates a second audio device of a second audience member is to output the second audio track;
   determining, based on the digital rights management key, that a first audio player of the media player is allowed to access and play the first audio track for the video simultaneously with a second audio player of the media player accessing and playing the second audio track comprising the audio-narrated description of the video, and a video player accessing and playing the video;
   sending, in response to the determining, the video to a display coupled to the media player by the video player of the media player for displaying of the video to the first audience member and the second audience member;
   sending, in response to the determining, the first audio track, concurrently with the sending of the video to the display, to the first audio device of the first audience member by the first audio player of the media player; and
   sending, in response to the determining, the second audio track, concurrently with the sending of the video to the display and the sending of the first audio track to the first audio device, to the second audio device of the second audience member by the second audio player of the media player.

2. The computer-implemented method of claim 1, wherein the first audio track includes speech and sounds in the video, and the second audio track includes the speech and the sounds in the video with the audio-narrated description added.

3. The computer-implemented method of claim 1, further comprising:
   synchronizing, by a first synchronizer of the first audio player, an output of the first audio track by the first audio device with the video being displayed on the display; and
   synchronizing, by a second synchronizer of the second audio player, an output of the second audio track by the second audio device with the video being displayed on the display.

4. A computer-implemented method comprising:
   receiving an indication by a media player that indicates a first audio device of a first audience member is to output a first audio track for a video, and that indicates a second audio device of a second audience member is to output a second audio track that includes different content for the video than the first audio track, wherein the video, the first audio track for the video, and the second audio track that includes different content for the video than the first audio track are protected by a digital rights management key;
   determining, based on the digital rights management key, that the media player is allowed to simultaneously play the video, the first audio track for the video, and the second audio track that includes different content for the video than the first audio track;
   sending the video to a display coupled to the media player for displaying of the video to the first audience member and the second audience member;

sending the first audio track, concurrently with the sending of the video to the display, to the first audio device of the first audience member by a first audio player of the media player; and sending, in response to the determining, the second audio track, concurrently with the sending of the video to the display and the sending of the first audio track to the first audio device, to the second audio device of the second audience member by a second audio player of the media player.

5. The computer-implemented method of claim 4, wherein the first audio track includes speech and sounds in the video, and the second audio track includes the speech and the sounds in the video with an audio-narrated description of the video added.

6. The computer-implemented method of claim 4, further comprising:

synchronizing, by a first synchronizer of the first audio player, an output of the first audio track by the first audio device with the video being displayed on the display; and synchronizing, by a second synchronizer of the second audio player, an output of the second audio track by the second audio device with the video being displayed on the display.

7. The computer-implemented method of claim 4, wherein the media player is implemented by a media player device, and the first audio device comprises one or more internal speakers of the media player device.

8. The computer-implemented method of claim 7, wherein the second audio device is a headphone device with a speaker that is external from the media player device.

9. The computer-implemented method of claim 4, further comprising:

displaying a graphical user interface to a user of the media player that includes a first interface element to select the second audio device to output the second audio track; and causing the sending of the second audio track to the second audio device of the second audience member by the second audio player of the media player in response to the user selecting the second audio device via the first interface element.

10. The computer-implemented method of claim 9, further comprising:

displaying the graphical user interface to the user of the media player that includes a second interface element to select the first audio device to output the first audio track; and causing the sending of the first audio track to the first audio device of the first audience member by the first audio player of the media player in response to the user selecting the first audio device via the second interface element.

11. The computer-implemented method of claim 4, wherein the first audio device and the second audio device are not part of a single set of speakers of a multiple channel audio system.

12. The computer-implemented method of claim 4, further comprising displaying an audio control interface element for the second audio device on the display.

13. The computer-implemented method of claim 12, wherein the audio control interface element is a volume control for the second audio device on the display.

14. The computer-implemented method of claim 13, wherein the audio control interface element is not a volume control for the first audio device.

15. A non-transitory computer-readable medium storing code that, when executed by a device, causes the device to perform a method comprising:

receiving an indication by a media player that indicates a first audio device of a first audience member is to output a first audio track for a video, and that indicates a second audio device of a second audience member is to output a second audio track that includes different content for the video than the first audio track, wherein the video, the first audio track for the video, and the second audio track that includes different content for the video than the first audio track are protected by a digital rights management key;

determining, based on the digital rights management key, that the media player is allowed to simultaneously play the video, the first audio track for the video, and the second audio track that includes different content for the video than the first audio track;

sending the video to a display coupled to the media player for displaying of the video to the first audience member and the second audience member;

sending the first audio track, concurrently with the sending of the video to the display, to the first audio device of the first audience member by a first audio player of the media player; and sending, in response to the determining, the second audio track, concurrently with the sending of the video to the display and the sending of the first audio track to the first audio device, to the second audio device of the second audience member by a second audio player of the media player.

16. The non-transitory computer-readable medium of claim 15, wherein the first audio track includes speech and sounds in the video, and the second audio track includes the speech and the sounds in the video with an audio-narrated description of the video added.

17. The non-transitory computer-readable medium of claim 16, wherein the method further comprises:

synchronizing, by a first synchronizer of the first audio player, an output of the first audio track by the first audio device with the video being displayed on the display; and synchronizing, by a second synchronizer of the second audio player, an output of the second audio track by the second audio device with the video being displayed on the display.

18. The non-transitory computer-readable medium of claim 15, further comprising:

displaying a graphical user interface to a user of the media player that includes a first interface element to select the second audio device to output the second audio track; and causing the sending of the second audio track to the second audio device of the second audience member by the second audio player of the media player in response to the user selecting the second audio device via the first interface element.

19. The non-transitory computer-readable medium of claim 15, wherein the method further comprises displaying an audio control interface element for the second audio device on the display.

20. The non-transitory computer-readable medium of claim 19, wherein the audio control interface element is a volume control for the second audio device on the display, and the audio control interface element is not a volume control for the first audio device.

\* \* \* \* \*